(12) United States Patent
Jokilehto

(10) Patent No.: US 8,007,280 B2
(45) Date of Patent: Aug. 30, 2011

(54) EDUCATIONAL GAME EMPLOYING CATEGORIES

(76) Inventor: Cathy Lynne Jokilehto, Parma Heights, OH (US)

( * ) Notice: Subject to any disclaimer, the term of this patent is extended or adjusted under 35 U.S.C. 154(b) by 1001 days.

(21) Appl. No.: 11/828,401

(22) Filed: Jul. 26, 2007

(65) Prior Publication Data

US 2009/0029327 A1  Jan. 29, 2009

(51) Int. Cl.
G09B 19/22 (2006.01)

(52) U.S. Cl. ........................................ 434/128

(58) Field of Classification Search ................. 434/128, 434/156, 167, 168, 171; 273/236, 239, 244, 273/244.1
See application file for complete search history.

(56) References Cited

U.S. PATENT DOCUMENTS

| | | | |
|---|---|---|---|
| 1,635,734 A | 7/1927 | Ziegler | |
| 3,171,214 A | 3/1965 | Sutherland | |
| 3,197,891 A * | 8/1965 | Pierce | 273/269 |
| 3,389,480 A * | 6/1968 | Holland | 273/272 |
| 3,885,326 A * | 5/1975 | Robinson et al. | 434/170 |
| 4,000,897 A | 1/1977 | York | |
| 4,021,937 A * | 5/1977 | Kravitz | 434/167 |
| 4,445,869 A * | 5/1984 | Wasserman | 434/156 |
| 4,465,282 A | 8/1984 | Dillon | |
| 4,470,821 A * | 9/1984 | LeCapelain | 434/172 |
| 4,478,582 A * | 10/1984 | Tucker | 434/170 |
| 4,613,309 A * | 9/1986 | McCloskey | 434/170 |
| 4,900,033 A | 2/1990 | Campos et al. | |
| 4,921,251 A | 5/1990 | Kanenwisher | |
| 5,458,338 A * | 10/1995 | Beardsley | 273/269 |
| 5,722,834 A * | 3/1998 | Rivera et al. | 434/128 |
| 5,743,740 A * | 4/1998 | Visser et al. | 434/128 |
| 6,076,828 A * | 6/2000 | McGill | 273/292 |
| 6,899,335 B2 | 5/2005 | Wilson | |
| 7,350,781 B2 * | 4/2008 | Shalit | 273/240 |
| 2006/0214370 A1 | 9/2006 | Schneider | |

* cited by examiner

Primary Examiner — Kurt Fernstrom
(74) Attorney, Agent, or Firm — Renner, Otto, Boisselle & Sklar, LLP

(57) ABSTRACT

A game serving as a tool for facilitating the education of elementary students in learning proper categorization of learning elements. The game includes a plurality of station markers suitable for being arranged physically in sequence, with each station marker representing a corresponding education category. The game further includes a plurality of tokens, each of the tokens including indicia representative of an item belonging to one of the educational categories. Each of the plurality of station markers includes a receiving area for receiving tokens from among the plurality of tokens.

20 Claims, 2 Drawing Sheets

EDUCATIONAL GAME EMPLOYING CATEGORIES

TECHNICAL FIELD

The present invention relates generally to educational games, and more particularly to educational games for teaching children through use of categories.

BACKGROUND OF THE INVENTION

Maintaining the interest of children interest is an important component to teaching children effectively. One way to maintain the interest of a child is to make the subject matter being taught more fun.

In the past, teachers have employed a variety of educational games in an effort to teach their students more effectively. It is desirable to increase the types of educational games available so that teachers may continue to maintain the interest of their students and provide the students with a solid educational foundation.

SUMMARY OF THE INVENTION

According to an aspect of the invention, a game is provided for play by at least two opposing teams. The game serves as a tool for facilitating the education of elementary students in learning proper categorization of learning elements. The game includes a plurality of station markers suitable for being arranged physically in sequence, with each station marker representing a corresponding education category and each station marker is capable of being arranged physically separate from every other station marker. The game further includes a plurality of tokens, each of the tokens including indicia representative of an item belonging to one of the educational categories. Each of the plurality of station markers includes a receiving area for receiving tokens from among the plurality of tokens, permitting players to physically travel to the location of each station marker to deposit the tokens in the receiving areas.

According to another aspect, each of the plurality of station markers has a shape that relates to the game of baseball.

According to still another aspect, the plurality of station markers are shaped at least in part in the form of a baseball bat.

In accordance with another aspect, the plurality of station markers are shaped at least in part in the form of a baseball.

According to still another aspect, the plurality of station markers are shaped at least in part in the form of a baseball mitt.

According to yet another aspect, each of the station markers includes a label for identifying the corresponding educational category of the station.

In accordance with another aspect, the educational categories each represent a different word type.

In accordance with yet another aspect, the different word types are selected from a group comprising nouns, verbs, adjectives and adverbs, and the items represented on the tokens are words selected from a group comprising nouns, verbs, adjectives and adverbs.

According to another aspect, the different word types are selected from a group comprising common nouns, proper nouns and pronouns, and the items represented on the tokens are words selected from a group comprising common nouns, proper nouns and pronouns.

In accordance with still another aspect, the game further includes a timer for measuring elapsed time.

In according with yet another aspect, each of the tokens includes a means for removably attaching the token to a presentation board.

According to another aspect of the invention, a method is provided for playing a game between at least two opposing teams, the game serving as a tool for facilitating the education of elementary students in learning proper categorization of learning elements, The game includes a plurality of station markers suitable for being arranged physically in sequence, with each station marker representing a corresponding education category, and a plurality of tokens, each of the tokens including indicia representative of an item belonging to one of the educational categories. Each of the plurality of station markers includes a receiving area for receiving tokens from among the plurality of tokens. The method includes the steps of: arranging the plurality of station markers physically in sequence; acquiring at least one of the plurality of tokens for each team; a member of each team proceeding to each station marker in sequence while depositing the at least one of the plurality of tokens in the receiving area of one of the plurality of station markers; and awarding credit to a team whose member deposits the at least one of the plurality of tokens in the receiving area of the station marker representing the category to which the item represented by the token properly belongs.

According to another aspect, the station markers are arranged in a pattern of a baseball diamond, with the station markers representing first, second and third base.

In accordance with another aspect, each team member proceeds from a starting position representing home plate, to the station markers representing first, second and third base, in that order, before returning to the starting position.

According to still another aspect, the method further includes setting a time limit within which each team member must travel the complete the sequence.

According to still another aspect, team members proceeding through the sequence are prohibited from returning to a station marker once the station marker has been passed.

In accordance with still another aspect, each of the plurality of station markers has a shape that relates to the game of baseball.

According to another aspect, each of the station markers includes a label for identifying the corresponding educational category of the station.

In accordance with another aspect, the educational categories each represent a different word type.

According to another aspect, each of the tokens includes a means for removably attaching the token to a presentation board.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
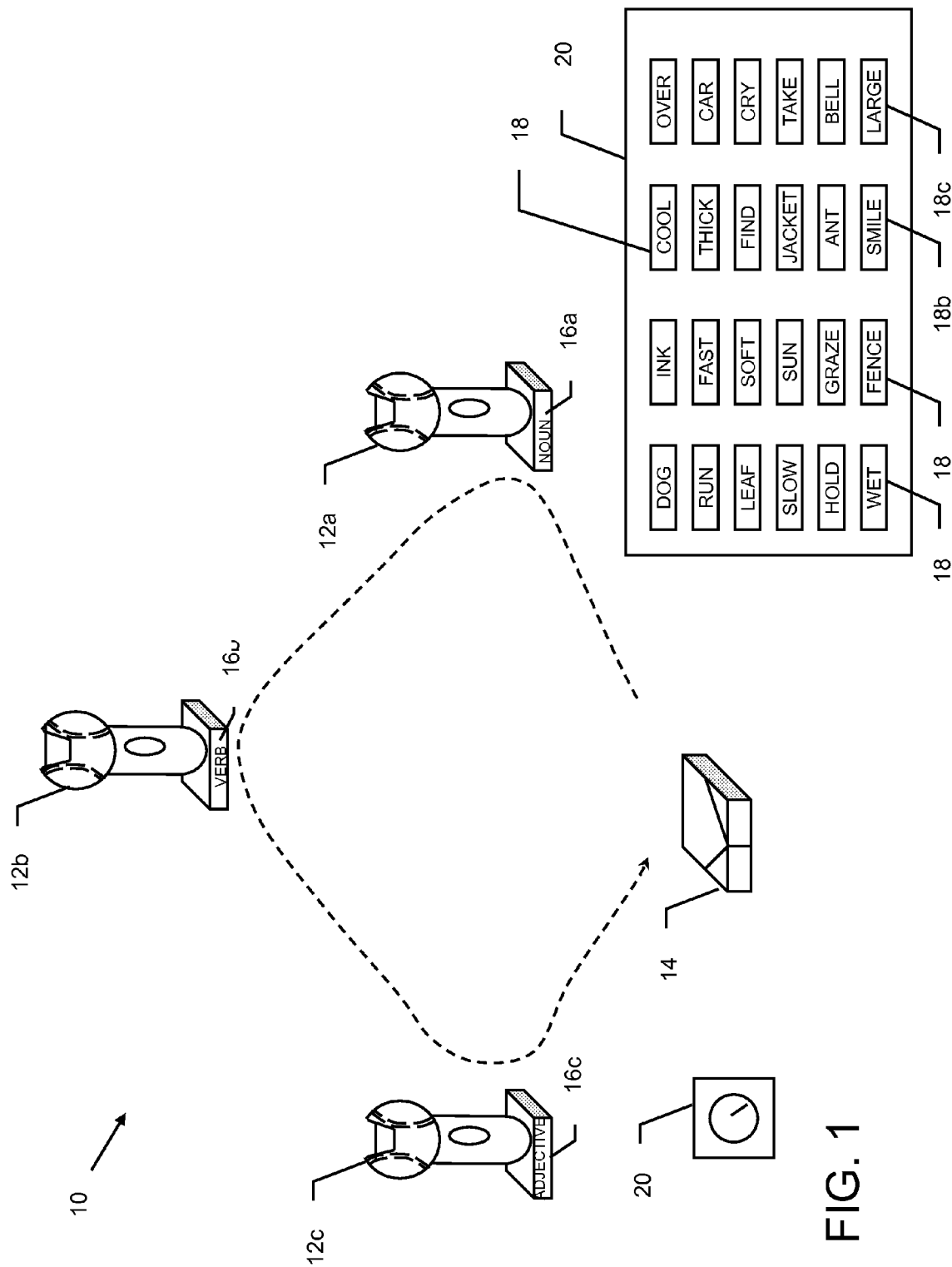
FIG. 1 is an environmental view of an educational game in accordance with an embodiment of the present invention.

The present invention will now be described with reference to the figures, in which like reference numerals are used to refer to like elements throughout.

Referring to FIG. 1, an educational game 10 is shown in accordance with an exemplary embodiment of the present invention. The educational game 10 is described herein primarily in the context of a baseball game. However, those having ordinary skill in the art will appreciate that the invention may emulate other types of sports games, etc., without departing from the scope of the invention.

The game 10 is played by at least two opposing teams. As will be appreciated, the game 10 serves as a tool for facilitating the education of elementary students in learning proper categorization of learning elements. The game 10 includes a plurality of station markers 12, in the exemplary embodiment representing "bases". The station markers 12 are suitable for being arranged physically in sequence, wherein each station marker is capable of being arranged physically separate from every other station marker. In the exemplary embodiment, the bases 12 are arranged as a baseball diamond sequence with first base 12a, followed by second base 12b, followed by third base 12c. The sequence may be completed by a home plate 14.

The station markers, or bases 12, each represent a corresponding education category. For example, suppose a teacher wishes to teach his or her students different word types, e.g., nouns, verbs and adjectives. First base 12a includes a label 16a (preferably interchangeable with other labels 16) identifying the base as a receipt location for "nouns". Similarly, second base 12b includes a label 16b identifying the base as a receipt location for "verbs". Likewise, third base 12c includes a label 16c identifying the base as a receipt location for "adjectives". Different labels 16 representing different categories may be provided with the game 10, as will be appreciated.

The game 10 further includes a plurality of tokens 18. Each of the tokens 18 includes indicia representative of an item or element belonging to one of the educational categories represented by the respective station markers 12. For example, the tokens 18 in the exemplary embodiment each include a different word representing at least one of a noun, verb or adjective. In the case of token 18a, the token has the word "large" printed thereon, representing an adjective. In the case of token 18b, the token has the word "smile" printed thereon which, of course, can represent a noun or a verb.

The tokens 18 preferably include means for removably attaching the token 18 to a presentation board 20. For example, the tokens 18 may each include a magnetic backing enabling the token 18 to be mounted to a presentation board 20, such as the blackboard in a classroom. Preferably, the presentation board 20 is located adjacent home plate 14.

According to the exemplary embodiment of the game 10, the teacher (or "umpire") is in charge of the game. The student members of the class are divided into two "teams", and are given a few minutes to determine their "batting order". The teacher then tells one student or a group of students from each team (e.g., the "visiting" team and the "home" team) to step up to home plate 14. The students are then given a short time, e.g., 15 seconds, to approach the board 20, remove one or more words (as decided by the teacher), and then run around the bases in order, i.e. players physically travel to the location of each station marker to deposit the tokens in the receiving areas, e.g., in sequence from home plate 14, to first base 12a, to second base 12b, to third base 12c, and back to home plate 14. The student or group of students from each team may take their turn separately, one team after the other or both teams at the same time for added excitement.

As each student runs around the bases 12, the student must deposit his/her word or words at the correct base 12 representing the particular category to which the word belongs. Thus, for example, if a student is carrying a token 18 with the noun "leaf", the student must place the token 18 in a receiving area included in first base 12a in order to score a "run". If a student is carrying a token 18 with the word "cry" which can be a noun or a verb, the student receives a "run" by correctly placing the token 18 in either first base 12a corresponding to nouns, or second base 12b corresponding to verbs.

Notably, as the students run around the bases in an effort to deposit their token(s) 18 in the correct base 12, the students are not permitted to go back to any base 12 that they have already passed. A timer 20 is included in the game to keep track of the time permitted (e.g., 15 seconds) for the students to run all the way around the bases. The amount of time provided to the students may be adjusted according to the age and/or ability of the students as will be appreciated.

If a student places a token 18 in the receiving area of the base 12 that does not correspond to the category of the particular token 18 as the student completes the trip around the bases 12, no "run" is awarded. Similarly, if a student is still holding a token 18 after completing the trip around the bases, or if a student fails to complete the trip around the bases in the allotted time, no "run" is awarded. The above-described process is repeated until all of the students of each team have been given at least one opportunity to "bat".

An "inning" may be defined as the case where each member of a given team has had an opportunity to bat once. Each game can be made up of multiple innings. Following a team "batting" in a given inning, the teacher goes to first base 12a and holds up each token 18 one by one as found within the receiving area of the base. Verbally, encouraging participation from all of the players, the teacher determines if the token 18 with the corresponding word has been properly identified via placement in the correct base 12. The process is then repeated for second and third base 12. As previously noted, each correctly identified word from the tokens 18 counts as a run. The team that receives the most "runs" wins.

There of course may be different variations to the game 10 as outlined above. For example, the students may be asked to select their token or tokens 18 with their eyes closed or blindfolded. This increases the likelihood the student will receive a token 18 with a word that he or she is not particularly familiar with.

As another alternative, only two of the bases 12 may include a label 16a identifying a particular category. The other base 12 remains unlabeled suggesting to the students that no tokens 18 should be deposited at the base 12. This variation is particularly beneficial at the beginning of the school year when students may not be able to correctly identify all categories (e.g., all types of words).

The tokens 18 may be separated into two groups, or one group for each team. The groups may or may not be identical. The tokens 18 of each group may have the same color. For example, a first group of tokens 18 for the "visiting" team may include red letters, whereas a second group of tokens 18 for the "home" team may include black letters. The tokens 18 may then be presented on the board 20 separated by groups or interspersed. By having two different groups, the teacher may attempt to balance the level of difficulty associated with the respective groups. By each group having its own respective color, it is easy to identify which team a "run" is to be awarded in the case where members of both teams proceed around the bases at the same time.

Figure 2:
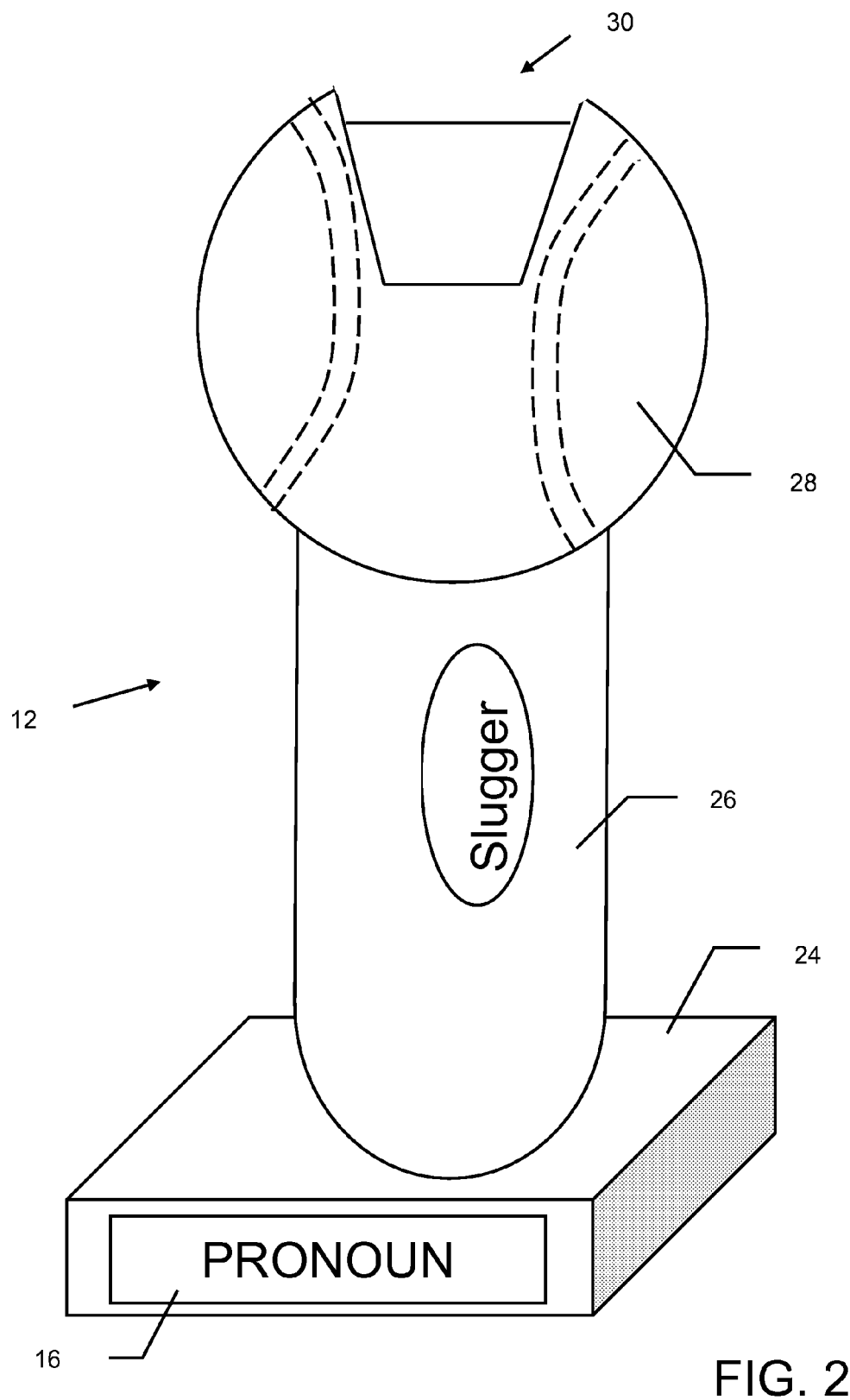
FIG. 2 is a perspective view of a station marker in accordance with an embodiment of FIG. 1.

Referring to FIG. 2, an exemplary embodiment of a station marker 12 is shown. In the example described herein where the station markers 12 are arranged in the form of a baseball diamond and the game is carried out so as to resemble baseball, the station markers 12 have a shape that relates to the game of baseball. As shown in FIG. 2, the station marker 12 has a base 24 which visually resembles a "base" in baseball. The station marker 12 further includes a stand 26 mounted to the base 24 and resembling a baseball bat at least in part. Attached at the end of the bat-shaped stand 26 is a baseball shaped enclosure 28. The baseball shaped enclosure 28 is generally hollow, and includes an opening 30 at the top. The baseball shaped enclosure 28 represents a receiving area of the station marker 12. The opening 30 is sized to allow the students to conveniently deposit their tokens 18 within the receiving area as they run around the bases. In another embodiment, the baseball shaped enclosure 28 may be replaced by a receiving area shaped similar to a baseball mitt.

As previously noted, the station marker 12 includes a label 16 for identifying the corresponding educational category of the station. In the exemplary embodiment, the educational categories each represent a different word type. The different word types are selected from a group comprising nouns, verbs, adjectives and adverbs, and the words represented on the tokens 18 are words selected from a group comprising nouns, verbs, adjectives and adverbs. As another alternative, the different word types may be selected from a group comprising common nouns, proper nouns and pronouns, and the items represented on the tokens 18 are words selected from a group comprising common nouns, proper nouns and pronouns.

Although the invention has been shown and described with respect to certain preferred embodiments, it is obvious that equivalents and modifications will occur to others skilled in the art upon the reading and understanding of the specification. For example, the educational categories represented by the respective station markers 12 in the exemplary embodiment relate to word types. However, other types of educational categories may be represented without departing from the scope of the invention. In another embodiment, it may be desirable to the teacher to teach the students geography. Each station marker 12 may then include a label 16 identifying a respective continent, for example. The tokens 18 may then each include a particular country. The students running the sequence are required to place the token 18 having a particular country in the receiving area of the station marker 12 representing the continent to which the country belongs.

Still further, the game 10 may be used to teach other types of educational categories, whether it be in math, science, geography, language, etc. The present invention is not intended to be limited to the specific embodiments described herein.

The present invention includes all such equivalents and modifications, and is limited only by the scope of the following claims.

What is claimed is:

1. A game to be played by at least two opposing teams for use as a tool for facilitating the education of elementary students in learning proper categorization of learning elements, comprising:
   a plurality of station markers suitable for being arranged physically in sequence, with each station marker representing a corresponding education category, wherein each station marker is capable of being arranged physically separate from every other station marker; and
   a plurality of tokens, each of the tokens comprising indicia representative of an item belonging to one of the educational categories,
   wherein each of the plurality of station markers comprises a receiving area for receiving tokens from among the plurality of tokens, permitting players to physically travel to the location of each station marker to deposit the tokens in the receiving areas.

2. The game of claim 1, wherein each of the plurality of station markers has a shape that relates to the game of baseball.

3. The game of claim 2, wherein the plurality of station markers are shaped at least in part in the form of a baseball bat.

4. The game of claim 2, wherein the plurality of station markers are shaped at least in part in the form of a baseball.

5. The game of claim 2, wherein the plurality of station markers are shaped at least in part in the form of a baseball mitt.

6. The game of claim 1, wherein each of the station markers includes a label for identifying the corresponding educational category of the station.

7. The game of claim 1, wherein the educational categories each represent a different word type.

8. The game of claim 7, wherein the different word types are selected from a group comprising nouns, verbs, adjectives and adverbs, and
   the items represented on the tokens are words selected from a group comprising nouns, verbs, adjectives and adverbs.

9. The game of claim 7, wherein the different word types are selected from a group comprising common nouns, proper nouns and pronouns, and
   the items represented on the tokens are words selected from a group comprising common nouns, proper nouns and pronouns.

10. The game of claim 1, further comprising a timer for measuring elapsed time.

11. The game of claim 1, wherein each of the tokens includes a means for removably attaching the token to a presentation board.

12. A method of playing the game of claim 1, comprising the steps of:
   arranging the plurality of station markers physically in sequence;
   acquiring at least one of the plurality of tokens for each team;
   a member of each team proceeding to each station marker in sequence while depositing the at least one of the plurality of tokens in the receiving area of one of the plurality of station markers; and
   awarding credit to a team whose member deposits the at least one of the plurality of tokens in the receiving area of the station marker representing the category to which the item represented by the token properly belongs.

13. The method of claim 12, wherein the station markers are arranged in a pattern of a baseball diamond, with the station markers representing first, second and third base.

14. The method of claim 13, wherein each team member proceeds from a starting position representing home plate, to the station markers representing first, second and third base, in that order, before returning to the starting position.

15. The method of claim 14, further comprising setting a time limit within which each team member must travel the complete the sequence.

16. The method of claim 14, wherein team members proceeding through the sequence are prohibited from returning to a station marker once the station marker has been passed.

17. The method of claim 12, wherein each of the plurality of station markers has a shape that relates to the game of baseball.

18. The method of claim 12, wherein each of the station markers includes a label for identifying the corresponding educational category of the station.

19. The method of claim 12, wherein the educational categories each represent a different word type.

20. The method of claim 12, wherein each of the tokens includes a means for removably attaching the token to a presentation board.

* * * * *